United States Patent
Chen et al.

(10) Patent No.: US 8,664,964 B2
(45) Date of Patent: Mar. 4, 2014

(54) DISPLAY DEVICE AND SYSTEM FOR INSPECTING BONDING RESISTANCE AND INSPECTING METHOD THEREOF

(75) Inventors: Chih-Ming Chen, Taichung County (TW); Neng-Yi Lin, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 531 days.

(21) Appl. No.: 12/986,182

(22) Filed: Jan. 7, 2011

(65) Prior Publication Data

US 2012/0105085 A1  May 3, 2012

(30) Foreign Application Priority Data

Oct. 28, 2010 (TW) ............................... 99136994 A

(51) Int. Cl.
*G01R 27/08* (2006.01)
(52) U.S. Cl.
USPC ........................................................ 324/693
(58) Field of Classification Search
USPC ...................... 324/693, 705, 713, 750.3, 770; 228/103; 257/48; 438/14, 17, 18
See application file for complete search history.

(56) References Cited

U.S. PATENT DOCUMENTS

| | | | |
|---|---|---|---|
| 6,940,301 | B2 | 9/2005 | Chen |
| 7,036,062 | B2 * | 4/2006 | Morris et al. ................. 714/733 |
| 2005/0127936 | A1 | 6/2005 | Chen |
| 2006/0017448 | A1 * | 1/2006 | Chen et al. .................... 324/538 |
| 2007/0249176 | A1 * | 10/2007 | Chou et al. .................... 438/725 |
| 2008/0111564 | A1 * | 5/2008 | Shie .............................. 324/705 |
| 2009/0041177 | A1 * | 2/2009 | Chien et al. ..................... 377/64 |
| 2009/0284706 | A1 * | 11/2009 | Liu et al. ....................... 349/150 |

FOREIGN PATENT DOCUMENTS

| | | |
|---|---|---|
| CN | 1529175 | 9/2004 |
| CN | 1580793 | 2/2005 |
| CN | 101178419 | 5/2008 |
| CN | 101398539 | 4/2009 |
| CN | 101441339 | 5/2009 |
| CN | 101847357 | 9/2010 |
| TW | I245125 | 12/2005 |
| TW | I301201 | 9/2008 |
| TW | I309813 | 5/2009 |
| WO | 2010016312 | 2/2010 |

OTHER PUBLICATIONS

Horowitz, et al., The Art of Electronics, 2nd ed., pp. 523-524 (1989).*
"First Office Action of China counterpart application" issued on Aug. 2, 2012, p. 1-p. 9, in which the listed references (WO2010016312, CN101847357, CN1529175, CN1580793, CN101178419, CN101398539, and CN101441339).

* cited by examiner

*Primary Examiner* — Melissa Koval
*Assistant Examiner* — Daniel Miller
(74) *Attorney, Agent, or Firm* — Jianq Chyun IP Office

(57) ABSTRACT

A system for inspecting bonding resistance of a display device includes a display panel, at least one circuit board, at least one driving chip and a testing board. The display panel includes at least one testing conductive line and connecting conductive lines. The circuit board is connected with the testing conductive line and the connecting conductive lines. The driving chip includes at least one testing pad and connecting pads, respectively electrically connected to the testing conductive line and the connecting conductive lines; at least one comparator connected to the testing pad; and at least one logic circuit connected to the comparator. The testing board is connected to the circuit board and provides a test signal to the testing pad through the circuit board and the testing conductive line. The test signal is compared with a reference signal in the comparator, and the logic circuit determines a comparing result.

20 Claims, 7 Drawing Sheets

DISPLAY DEVICE AND SYSTEM FOR INSPECTING BONDING RESISTANCE AND INSPECTING METHOD THEREOF

CROSS-REFERENCE TO RELATED APPLICATION

This application claims the priority benefit of Taiwan application serial no. 99136994, filed on Oct. 28, 2010. The entirety of the above-mentioned patent application is hereby incorporated by reference herein and made a part of this specification.

BACKGROUND

1. Field of the Disclosure

The present invention relates to a display device, and more particularly to a system for inspecting bonding resistance and an inspecting method.

2. Description of Related Art

Generally speaking, asides from a display panel, a display device also includes a circuit board and a driving chip for driving an image display of the display panel. After the fabrication of a display device, a series of inspection procedures is performed to ensure that the display quality of the display device conforms to standards.

Currently, the method of inspecting the bonding resistance between the display panel and the circuit board, and the bonding resistance between the display panel and driving chip is performed with an automated optical inspection apparatus. The automated optical inspection apparatus, however, can only determine whether the pressed conductive particle number and the relative position between the display panel and the circuit board and between the display panel and driving chip are normal. Alternatively speaking, the automated optical inspection apparatus is unable to inspect the actual bonding resistance between the display panel and the circuit board, and between the display panel and the driving chip.

Another approach to inspect the bonding resistance is to additionally provide a voltage to two neighboring conductive lines on the display panel and to determine whether a short circuit occurs in order to ensure whether there is any bonding abnormality. With this inspection approach, any bonding defect would directly reflect as a white spot on the display panel (for example, with flickering or excessive current consumption, etc.). However, not all bonding defects can be determined with this inspection method. Hence, defective products are often not identified. Moreover this inspection method is more complicated and time consuming.

SUMMARY OF THE DISCLOSURE

The following disclosure is directed to a display device and a system for inspecting bonding resistance and a method for inspecting bonding resistance.

An exemplary embodiment of the disclosure provides a system for inspecting bonding resistance of a display device, and the system includes a display panel, at least one circuit board, at least one driving chip and a testing board. The display panel includes at least one testing conductive line and a plurality of connecting conductive lines. The circuit board and the testing conductive line of the display panel are electrically connected to the connecting conductive lines. The driving chip includes a plurality of connecting contact points and at least one testing contact point that are respectively electrically connected the connecting conductive lines of the display panel and the testing conductive line; at least one comparator electrically connected with the testing contact point; and at least one logic circuit electrically connected with the comparator. The testing board and the circuit board are electrically connected. More specifically, the testing board provides a test signal, and after the test signal is transmitted to the test contact of the driving chip through the circuit board and the testing conductive line, the test signal in the comparator is compared with a reference signal, and the logic circuit determines the comparison result of the comparator.

An exemplary embodiment of the disclosure provides a method for inspecting a display device, and the method includes providing a display device which includes a display panel, at least one circuit board and at least one driving chip that are electrically connected with the display panel, and a testing board that is electrically connected with the circuit board. The above-mentioned display panel includes at least one testing conductive line and a plurality of connecting conductive lines. Thereafter, a bonding resistance inspection procedure is performed, and the inspection procedure includes providing a test signal by the testing board, wherein the test signal is transmitted to the driving chip through the circuit board and the testing conductive line. The test signal is compared with a reference signal. If the test signal is greater than the reference signal, a first signal is output through one of the connecting conductive lines. If the test signal is smaller than the reference signal, a second signal is output through one of the connecting conductive lines.

An exemplary embodiment of the disclosure further provides a display device that includes a display panel, at least one circuit board and at least one driving chip. The display panel includes at least one testing conductive line and a plurality of connection conductive lines. The circuit board is electrically connected with the test conductive line of the display panel and the connecting conductive lines. The driving chip includes a plurality of connecting contact points and at least one testing contact point respectively electrically connected with connecting conductive lines of the display panel and the testing conductive line; at least one comparator electrically connected with the testing contact point; and at least one logic circuit electrically connected with the comparator.

According to the exemplary embodiments of the disclosure, the testing pads and the corresponding comparator and logic circuit are disposed on the driving chip. The acceptability of the bonding resistance may be determined based on the output signal of the comparator and the logic circuit. Hence, according to the inspection system and the inspection method of the exemplary embodiments of the disclosure, the acceptability of the bonding resistance can be more accurately determined than the conventional approaches, and the inspection of bonding resistance can be more readily achieved.

In order to the make the aforementioned and other objects, features and advantages of the present invention comprehensible, a preferred embodiment accompanied with figures are described in detail below.

DESCRIPTION OF EMBODIMENTS

Figure 1:
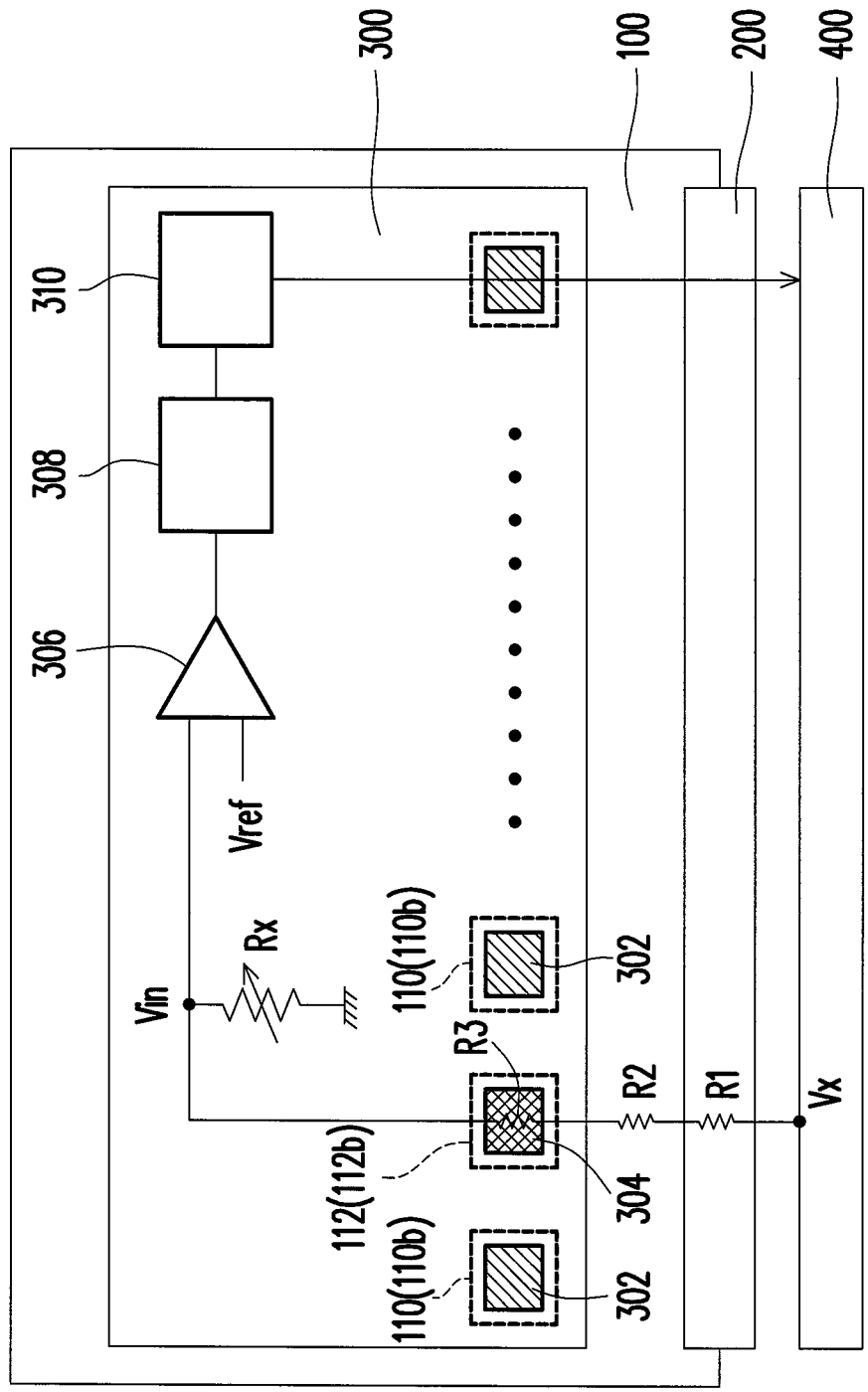
FIG. 1 is a schematic diagram of an inspection system for bonding resistance of a display device according to an exemplary embodiment of the disclosure.

FIG. 1 is a schematic diagram of an inspection system for bonding resistance of a display device according to an exemplary embodiment of the disclosure.

Figure 2:
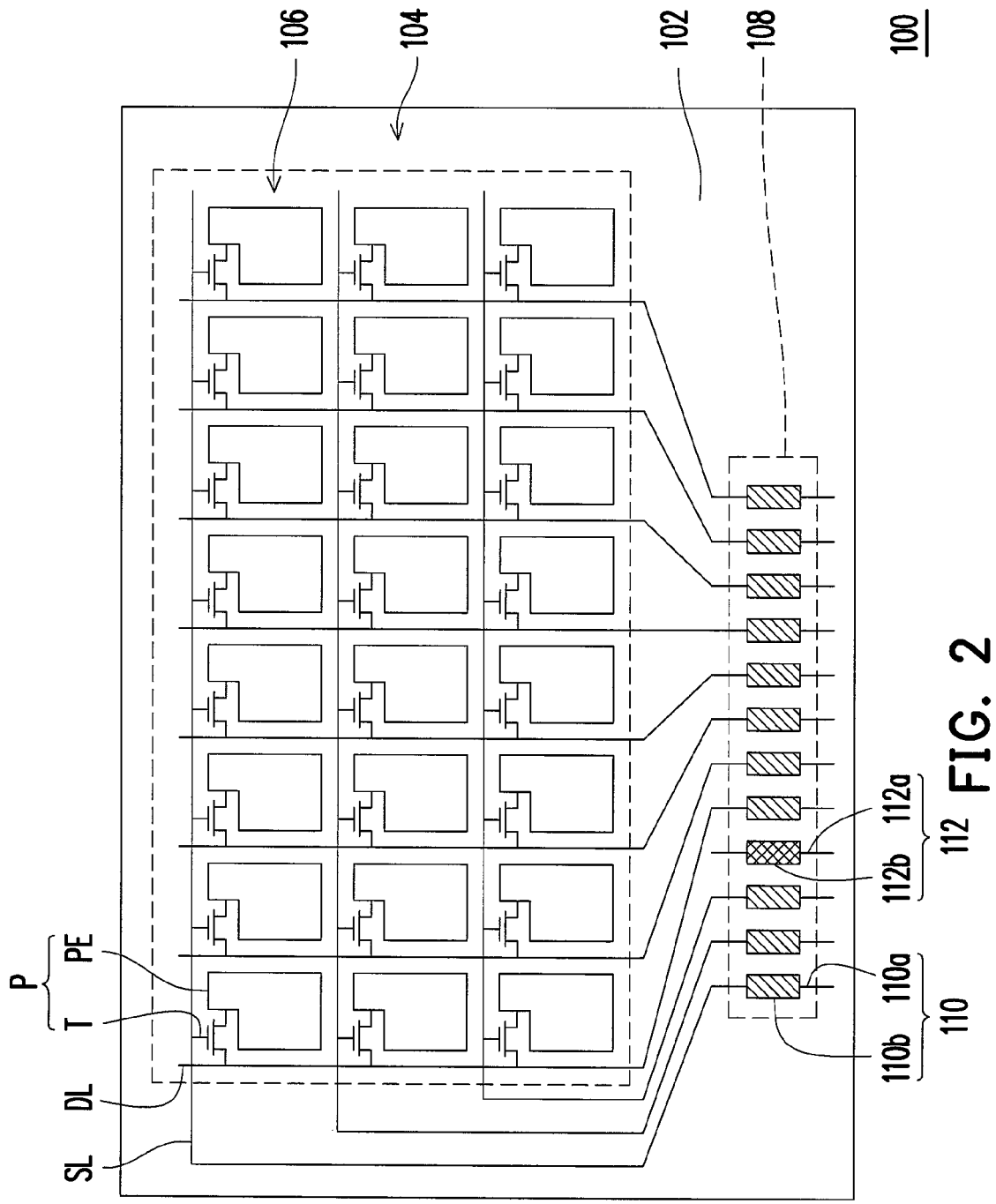
FIG. 2 is a schematic diagram of a display panel of FIG. 1.
Figure 3:
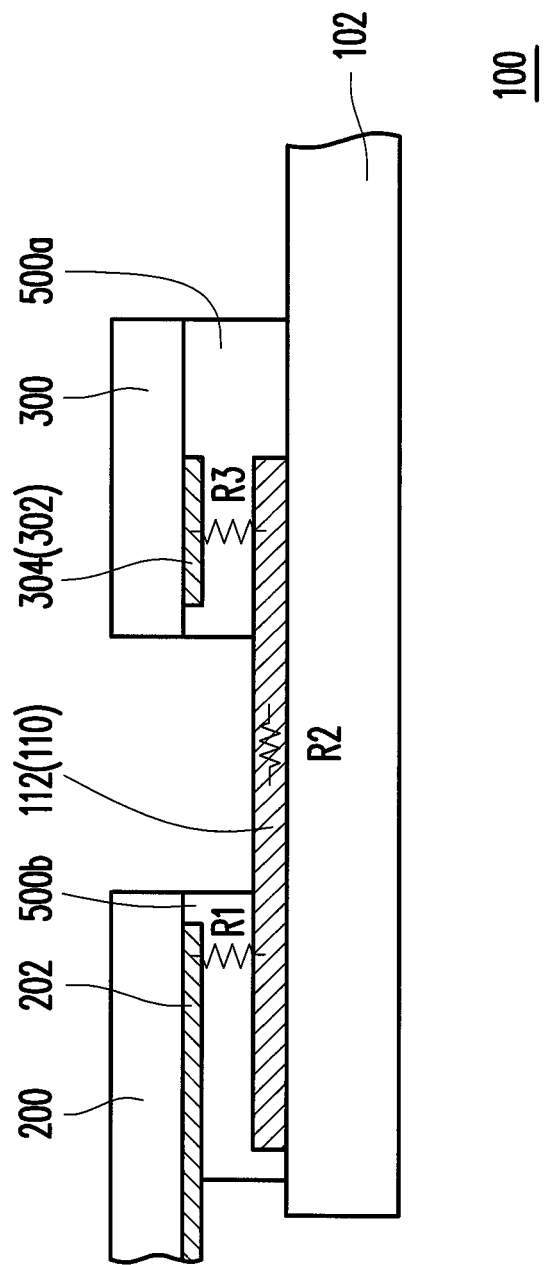
FIG. 3 is a side-view diagram of the display panel, the circuit board and the driving chip of FIG. 1.

FIG. 2 is a schematic diagram of the display panel of FIG. 1. FIG. 3 is a side-view diagram of the display panel, the circuit board and the driving chip of FIG. 1. Referring concurrently to FIGS. 1, 2 and 3, the inspection system for bonding resistance of a display device according to an exemplary embodiment includes a display panel 100, at least one circuit board 200, at least one driving chip 300 and a testing board 400.

The display panel 100 includes a plurality of connecting conductive lines 110 and at least one testing conductive line 112, wherein the connecting conductive lines 110 are used for inputting or outputting various signals, and the testing conductive lines 112 are used for inputting the testing conductive signal, as shown in FIG. 2. More specifically, the display panel 100 includes a substrate 102, a plurality of scan lines SL, a plurality of data lines DL, a plurality of pixel structures P, a plurality of connecting conductive lines 110 and at lest one testing line 112. The display panel is, for example, a liquid crystal (LC) display panel, an organic light emitting diode (OLED) display panel, an electrophoretic display panel or a plasma display panel, etc.

The substrate 102 is constituted with a material that includes, but not limited to, glass, quartz, organic polymer, or an opaque/reflective material (for example, a conductive material, metal, wafer, ceramic, or other appropriate materials) or other appropriate materials. The substrate 102 includes a bonding region 108, a display region 106, and a non-display region 104.

The scan lines SL and the data lines DL are configured on the substrate 102, extending from the display region 106 to the non-display region 104. According to an exemplary embodiment, the scan lines SL and the data lines DL cross each other, and an isolation layer is disposed between the scan lines SL and the data lines DL. Alternatively speaking, the extension direction of the data lines DL is not parallel to the extension direction of the scan lines SL. More specifically, the extension direction of the data lines D is perpendicular to the extension direction of the scan lines SL. Moreover, the scan lines SL and the data lines DL belong to different film layers. For the consideration of conductivity, the scan lines SL and the data lines DL are formed with a metal material. However, it is to be understood that these exemplary embodiments are presented by way of example and not by way of limitation. In other exemplary embodiments, other conductive materials may be applied for the scan lines SL and the data lines DL. For example, alloy, metal nitride, metal oxide, metal oxynitride or other appropriate materials or a stacked layer of metal material and other conductive materials which may provide sufficient conductivity.

The pixel structure P is disposed in the display region 106 of the substrate 102, and each pixel structure P is electrically connected with the corresponding scan line SL and the corresponding data line DL. According to an exemplary embodiment, the pixel structure P includes a switching device T and a pixel electrode PE, and the switching device T is electrically connected with the scan line SL and the data line DL, while the pixel electrode PE is electrically connected with the switching device T. The aforementioned switching device T could be a bottom gate thin film transistor or a top gate thin film transistor. The pixel electrode PE may be transmissive pixel electrode, a reflective pixel electrode or a transflective pixel electrode.

Moreover, the scan lines SL and the data lines DL extend from the display region 106 to the non-display region 104 to electrically connect with the driving chip 300, and each of the scan lines SL and each the data lines DL are respectively connected with a corresponding connecting conductive line 110. The connecting conductive lines 110 include conductive lines 110a and pads 110b. Further, in an exemplary embodiment, the testing conductive line 112 is disposed between the above plurality of connecting conductive lines 110, and the testing conductive line 112 is not electrically connected with the pixel structure P in the display region 106. In an exemplary embodiment of the disclosure as shown in FIGS. 1 and 2, one testing conductive line 112 is illustrated. However, the number of the testing conductive line should not be construed as limited to the embodiment set forth herein; in other exemplary embodiments, the number of the testing conductive line could be one or a plurality thereof. In this exemplary embodiment of the disclosure, the testing conductive line 112 may include a conductive line 112a and a testing pad 112b. The bonding region 108 in FIG. 2 depicts a chip press bonding region; in other words, the driving chip 300 is actually bonded in the bonding region 108.

According to an exemplary embodiment of the disclosure, if the above display panel is a liquid crystal display panel, the substrate 102 may further dispose with an opposite substrate and a liquid crystal layer (not shown). If the above display panel is an organic light emitting display panel, the substrate 102 may further dispose with an organic light emitting layer and an opposite substrate (not shown). If the above display panel is an electrophoretic display panel, the substrate 102 may further disposed with an opposite substrate and an electrophoretic display layer (not shown). In other words, the invention may be embodied in many different types of display panel.

The driving chip 300 includes a plurality of connecting contact points 302 and at least one testing contact point 304, such as conductive balls or conductive pins, that are respectively electrically connected with the connecting conductive lines 110 and the testing conductive line 112 of the display panel 100. According to an exemplary embodiment, the connecting contact points 302 of the driving chip 300 is electrically connected with the connecting conductive lines 110 via the connecting pads 110b of the display panel 100, and the testing contact point 304 of the driving chip 300 is electrically connected with the testing conductive line 112 via the testing pads 112b of the display panel 100.

Additionally, the driving chip 300 also includes a comparator 306 and a logic circuit 308 integrated in the driving chip 300. The comparator 306 and the testing pad 304 are electrically connected, and the logic circuit 308 and the comparator 306 are electrically connected. According to an exemplary embodiment of the disclosure, the driving chip 300 further includes a register 310 for temporary storing the information of the logic circuit 308.

Although certain illustrated embodiment herein refers one driving chip 300, it is to be understood that these embodiments are presented by way of example and not by way of limitation, and the number of driving chip 300 is not to be limited. Actually, the number of the driving chip 300 is related to the dimension of the display panel 100. Hence, the driving chip 300 may include at least one gate driving chip, at least one source driving chip, at least one integrated circuit integrated chip or a combination thereof.

Although the circuit board 200 is electrically connected with the testing conductive line 112 (and the connecting conductive line 110) of display panel 100. In an exemplary embodiment, the circuit board 200 includes at least one flexible printed circuit board (FPC) or other types of circuit board. Further, an anisotropic conductive film (ACF) 500b is typically used to electrically connect the circuit board 200 with the testing conductive line 112 (and the connecting conductive lines 110). More specifically, the circuit board 200 includes a plurality of conductive lines 202, and the plurality of conductive lines 202 respectively electrically connect with the testing conductive line 112 (and the connecting conductive lines 110). FIG. 3 is a schematic diagram illustrating the electrically connection of the testing conductive line 112 (and the connecting conductive lines 110).

It is worthy to point out that, according to an exemplary embodiment, the driving chip 300 and the circuit board 200 are bonded on the display panel 100 via anisotropic conductive films 500a and 500b, respectively, and the testing contact point 304 (and the connecting contact points 302) of the driving chip 300 is electrically connected with the testing conductive line 112 (and the connecting conductive lines 110) of the display panel 100. More specifically, after the fabrication of the display panel 100, anisotropic conductive films 500a, 500b are disposed in specific regions on the display panel 100. Thereafter, the driving chip 300 and the circuit board 200 are placed on the anisotropic conductive films 500a, 500b. Further, via a thermal compression bonding process, the driving chip 300 and the circuit board 200 are bonded on the display panel 100 through the anisotropic conductive films 500a, 500b, and the driving chip 300 (the connecting contact point 302 and the testing contact points 304) and the circuit board 200 (conductive lines 202) are only electrically connected with the display panel 100 (testing conductive line 112 and the connecting conductive lines 110) in the vertical direction. Since this technique is known in the art, it will not be further disclosed herein.

Generally speaking, if abnormality occurs during the above thermal compression bonding process, the bonding resistance (R3) between the driving chip 300 and the display panel 100 and/or the bonding resistance (R1) between the circuit board 200 and the display panel 100 become too high. Hence, an inspection system of an exemplary embodiment of the disclosure is further disposed with a testing board 400, which is electrically connected with the circuit board 200.

As shown in FIGS. 1 and 3, the above testing board 400 may provide a test signal (voltage value Vx), and the test signal (Vx) is transmitted to the testing contact point 304 of the driving chip 300 through the circuit board 200 and the testing conductive line 112 of the display panel 100. During the transmission of the test signal (Vx), a voltage drop is resulted from the contact resistance (R3) between the driving circuit 300 and the display panel 100, the resistance (R2) of the testing conductive line 112, and the contact resistance (R1) between the circuit board 200 and the display panel 100, and the ultimate voltage of the test signal (Vx) is Vin. Thereafter, this test signal Vin is compared with a reference signal (voltage value Vref) in the comparator 306, and the logic circuit 308 determines the comparison result, which could be further transformed into digital signal for output, of the comparator 306.

According to an exemplary embodiment of the disclosure, after the above logic circuit 308 determines the comparison result of the comparator 306, the logic circuit 308 also outputs the above comparison result to the testing board 400 through one of the connecting conductive lines 110 of the display panel 100. According to another exemplary embodiment of the disclosure, if the driving chip 300 further includes a register 310, the comparison result is temporarily stored in the register 310 after the logic circuit 308 determines the comparison result of the comparator 306, and then the comparison result is output to the testing board 400 via one of the connecting conductive lines 110 of the display panel 100.

More particularly, if the logic circuit 308 determines the test signal (voltage value Vin) in the comparator 306 being greater than the reference signal (Vref), the logic circuit 308 outputs a first signal (for example, output 1) based the comparative result through one of the connecting conductive lines 100 to indicate the test result is normal. Thereafter, the entire bonding resistance could be rapidly interpreted as normal through the microprocessor that is electrically connected with the testing board 400.

Conversely, if the logic circuit 308 determines the test signal (voltage Vin) in the comparator 306 being smaller than the reference signal (Vref), the voltage drop to the test signal may also result from other additional resistance (Rx), aside from the contact resistance (R3) between the driving chip 300 and the display panel 100, the contact resistance (R2) of the testing line 112, and the contact resistance between the circuit board 200 and the display panel 100. The so-called additional resistance (Rx) may be a value calculated based on an atypical bonding between the driving chip 300 and the display panel 100 and/or an atypical bonding between the circuit board 200 and the display panel 100. Hence, the logic circuit 308 outputs as a second signal (for example, output 0) based on the above-mentioned comparison result through one of the connecting conductive lines 110 to indicate the test result being abnormal. Thereafter, the entire bonding resistance could be rapidly interpreted as abnormal through the microprocessor that is electrically connected with the testing board 400.

Figure 4:
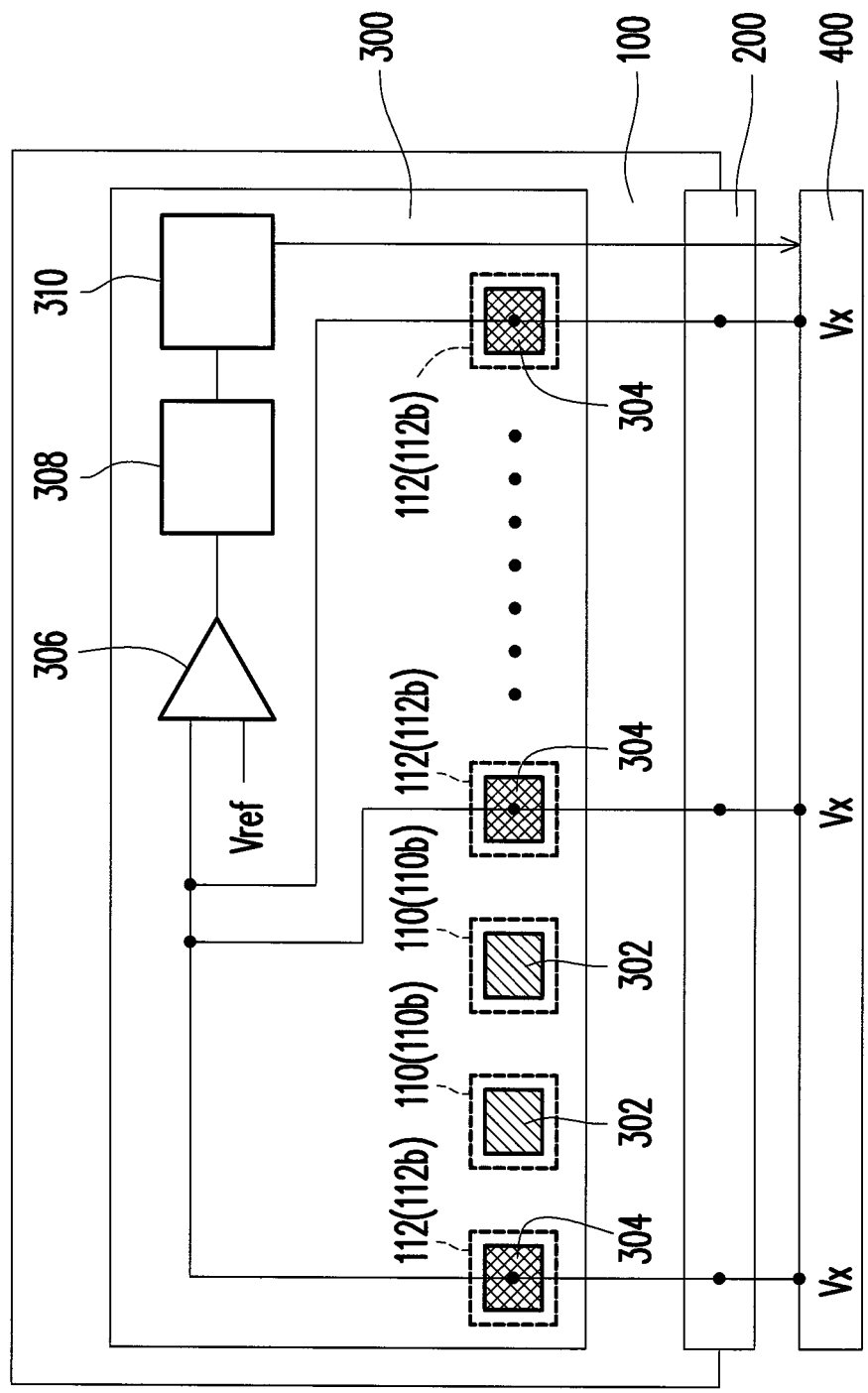
FIG. 4 is a schematic diagram of an inspection system for bonding resistance of a display device according to another exemplary embodiment of the disclosure.

FIG. 4 is a schematic diagram of an inspection system for bonding resistance of a display device according to another exemplary embodiment of the disclosure. The exemplary embodiment in FIG. 4 is similar to the exemplary embodiment in FIG. 1, and wherever possible, the same reference numbers are used to refer to the same or like parts in both Figures. The difference between the exemplary embodiment in FIG. 4 and the exemplary embodiment in FIG. 1 is that the driving chip 300 in this exemplary embodiment is also disposed with three testing contact points 304, aside from the plurality of testing contact points 302. The three testing contact points 304 are respectively disposed at the left side, the center and the right side of the driving chip 300. The display panel 100, which is configured under the driving chip 300, is also disposed with three testing conductive lines 112 (testing pads 112b) corresponding to the three testing pads 304 above. More specifically, the above three testing pads 304 and the comparator 306 are electrically connected. The exemplary embodiments of the disclosure may include, according the testing requirements, one or multiple testing pads 304 disposed on the driving chip 300, and one or multiple corresponding testing conductive lines 112 (testing pads 112b) disposed on the display panel 100. The above arrangements of the testing contact points 304 and testing conductive lines 112 can be adjusted according actual requirements, and are not to be construed as limiting the scope of the invention.

During the bonding inspection, the testing board 400 outputs test signals (voltage Vx) to the three testing pads 304. Thereafter, the test signal (Vin) in the comparator 306 is compared with the reference signal Vref, and then the logic circuit 308 determines the comparison result of the comparator 306.

With the three testing pads 304 disposed at the left side, the center and the right side of the driving chip 300, it is feasible to inspect the bonding resistance between the driving chip 300 and the display panel 100 at different positions. More specifically, for a display device using a driving chip 300 with a larger dimension, the design as disclosed in the exemplary embodiments is particularly useful in enhancing the inspection accuracy of the bonding resistance.

Although the illustrated embodiments of FIG. 4 refer to the application of three testing pads 304 disposed at the left side, the center and the right side of the driving chip 300, it is to be understood that these embodiments are presented by way of example and not by way of limitation. According to other exemplary embodiments, two testing contact points may be disposed on the right side and on the left side of the driving chip 300, respectively, or more than three testing contact points may be disposed on the driving chip 300.

Moreover, if the driving chip 300 is disposed with a plurality of testing contact points 304, a set of comparator 306 and logic circuit 308, in addition to the one set of commonly used comparator 306 and logic circuit 308, may also be disposed correspondingly to each testing pad.

Figure 5:
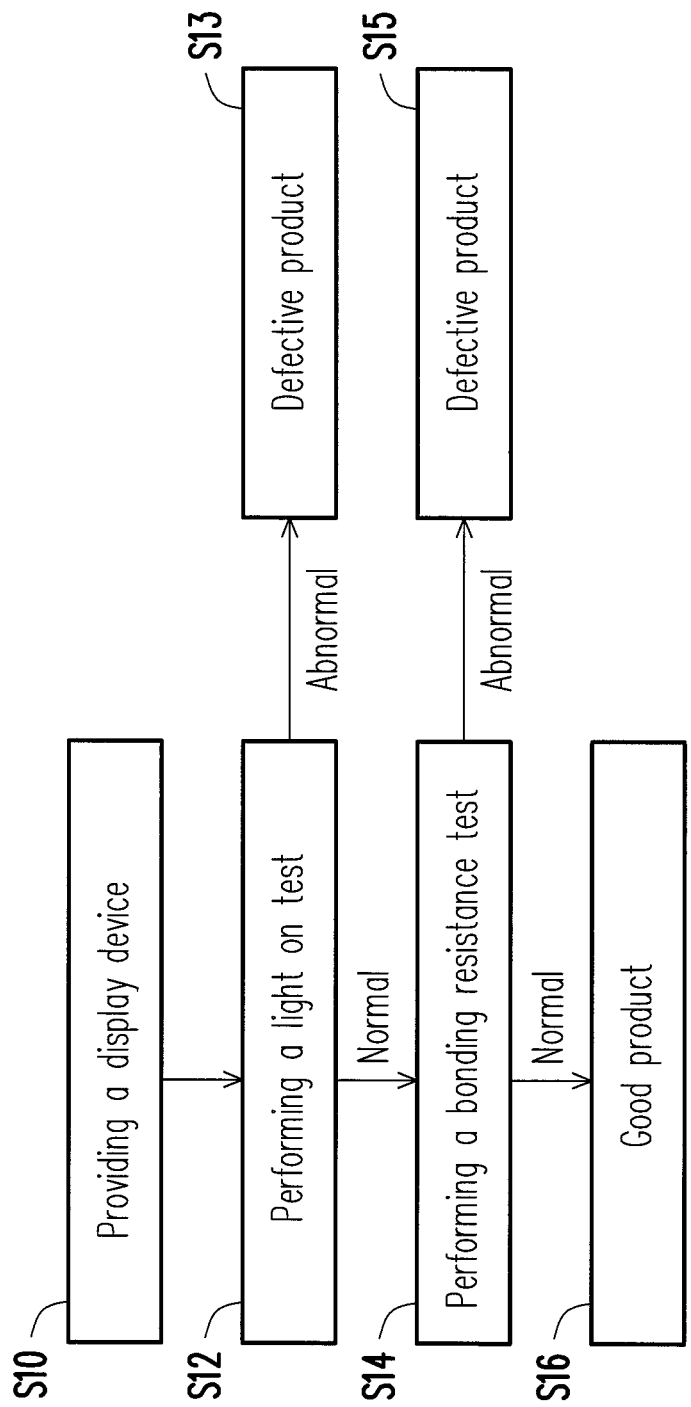
FIG. 5 is a flow diagram of steps in an exemplary inspection method of a display device according to one exemplary embodiment of the disclosure.

FIG. 5 is a flow diagram of steps in an exemplary inspection method of a display device according to one exemplary embodiment of the disclosure. Referring to FIG. 5, the inspection method for a display device in the exemplary embodiments includes providing a display device (S10). The above-mentioned display device includes, a liquid crystal (LC) display panel, an organic light emitting diode (OLED) display panel, an electrophoretic display panel or a plasma display panel, etc.

Thereafter, a light on test (Step S12) is performed. The light on test is performed on the display device to inspect the entire image of the display device for abnormal testing pattern or defect. If abnormality is identified in the light on test (step S12), the display device is considered as a defective product (step S13). The above defective product, depending on the degree of defectiveness, may be discarded as scrap or reworked.

If the light on test (step S12) result is normal, a bonding resistance test (step S14) is performed. In an exemplary embodiment, the bonding resistance test (step S14) is performed with the bonding resistance inspection system as shown in FIG. 1 or the bonding resistance inspection system as shown in FIG. 4.

If abnormality is being detected in the bonding resistance test (step S14), the display device is considered as a detective product (step S15). In other words, the product is defective probably because the bonding resistance between the driving chip and the display panel is too high or the bonding resistance between the circuit board and the display panel is too high. Generally speaking, when the bonding resistance between the driving chip and the display panel or the bonding resistance between the circuit board and the display panel is determined to be too high, the bonding procedure between the driving chip of the display device and the display panel or the bonding procedure between the circuit board and the display panel is reworked. After the rework process is completed, the bonding resistance test (step S14) is repeated.

If the result of the bonding resistance test (step S14) result is normal, it implies the display device is a good product (step S16), and the criteria for product shipment is achieved.

Figure 6A:
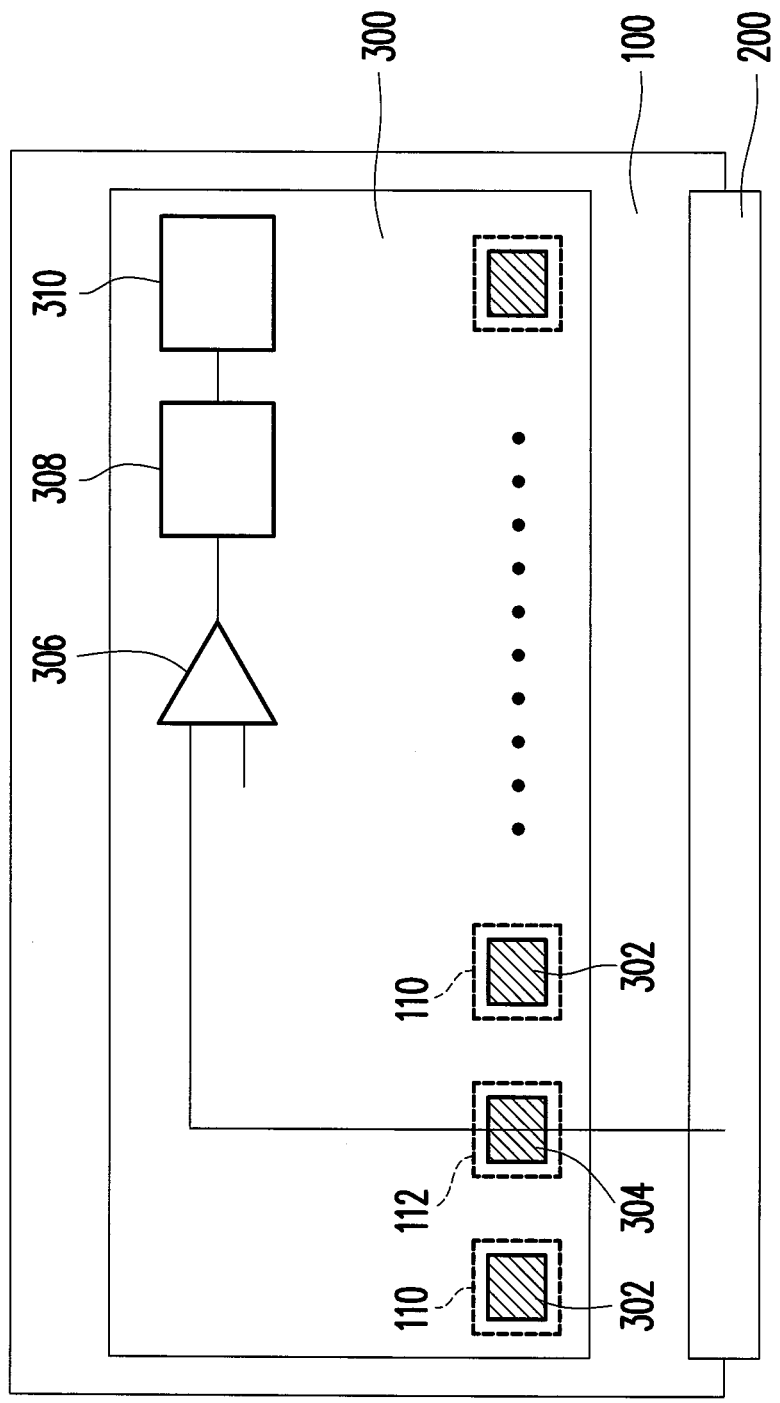
FIGS. 6A and 6B are schematic diagram of a display device according to an exemplary embodiment of the invention.
Figure 6B:
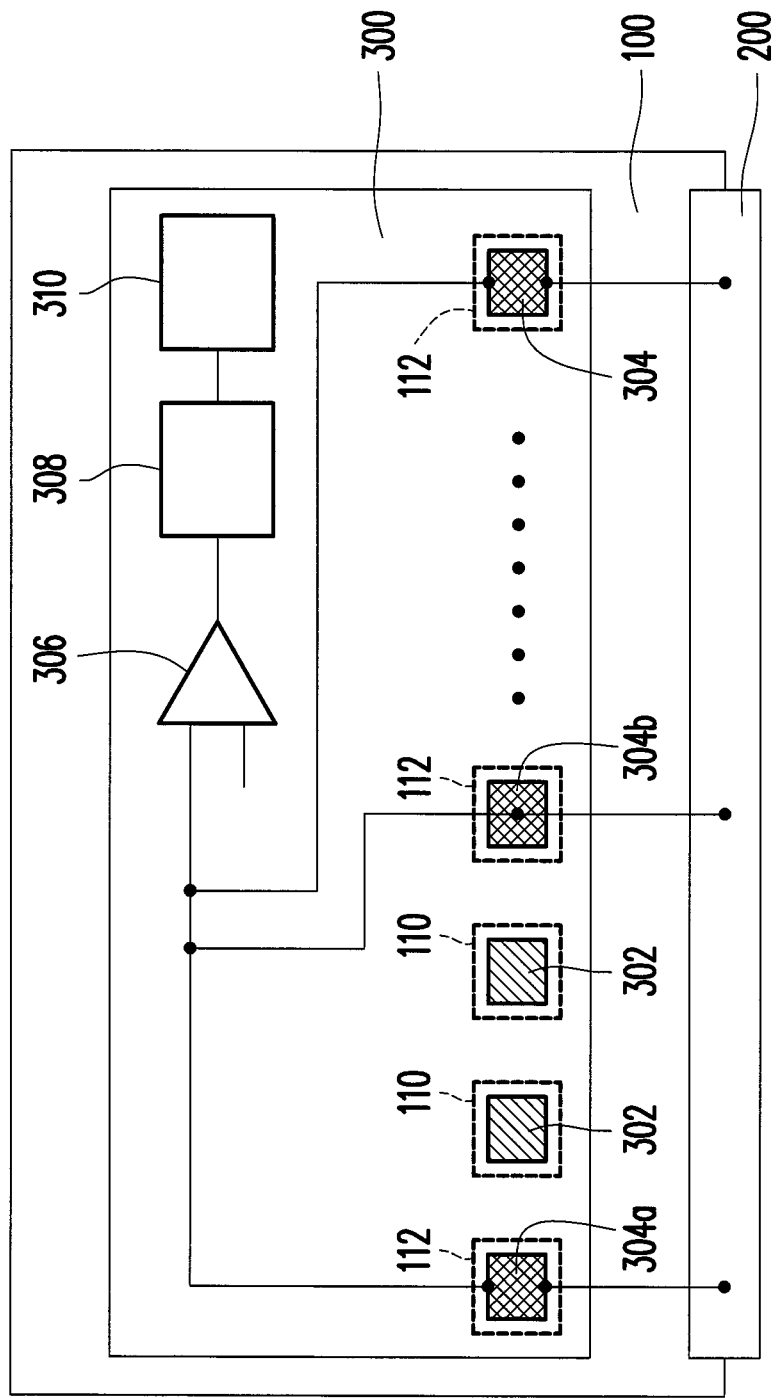

In the above step S16, when the display device is determined as a good product, prior to the shipment of products, the testing board in the inspection system (FIGS. 1 and 4) of bonding resistance is removed to form the display device as shown in FIGS. 6A and 6B. More particularly, the display device in FIG. 6A is a schematic diagram of a display device after a bonding test using the inspection system in FIG. 1. The display device in FIG. 6B is a schematic diagram of a display device after a bonding test using the inspection system in FIG. 4. In the display devices shown in FIGS. 6A and 6B, the testing pad 304, the comparator 306 and the logic circuit 308 (even the register 310) remain inside the driving chip 300. Since the above devices used in the testing only have an electrical connection with the conductive lines 112 of the display panel 100, the presence of these devices used in the testing does not affect the display operation of the display device.

According to the above exemplary embodiments of the disclosure, testing contact points are disposed on, and a comparator and a logic circuit are also correspondingly disposed on the driving chip of the display device. Based on the signals output from the comparator and the logic circuit, whether or not the bonding resistance between the display panel and the logic circuit in the display device or/and the bonding resistance the display panel and the circuit board is in the acceptable range can be promptly determined. Hence, according to the inspection system and the inspection method of the exemplary embodiments of the disclosure, the acceptability of the bonding resistance can be more accurately determined than the conventional approaches, and the inspection of bonding resistance can be more readily achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inspection system for bonding resistance of a display device, the inspection system comprising:
    a display panel, comprising at least three testing conductive lines and a plurality of connecting conductive lines;
    at least one circuit board, electrically connected with the three testing conductive lines and the plurality of connecting conductive lines;
    at least one driving chip, comprising:
        a plurality of connecting contact points electrically connected with the plurality of connecting conductive lines and at least three testing contact points, and each of the three testing contact points being respectively electrically connected with the three testing conductive lines, wherein the three testing conductive lines are connected together to form a testing signal line;
        at least one comparator, electrically connected with the testing signal line;
        at least one logic circuit, electrically connected with the at least one comparator; and
    a testing board, electrically connected with the at least one circuit board,
    wherein the testing board provides a test signal, and after the test signal is transmitted to the three testing contact points of the at least one driving chip through the at least one circuit board and the three testing conductive lines, the test signal in the at least one comparator is compared with a reference signal, and the at least one logic circuit determines a comparison result of the at least one comparator.

2. The inspection system of claim 1, wherein each of the testing conductive lines comprises a testing pad, and each of the testing contact point is electrically connected to the testing conductive line via the testing pad.

3. The inspection system of claim 1, wherein after the at least one logic circuit determines the comparison result of the at least one comparator, the comparison result is output to the testing board through one of the plurality of connecting conductive lines.

4. The inspection system of claim 1, wherein the at least one driving chip further comprises a register, and the comparison result of the at least one comparator is temporarily stored in the register.

5. The inspection system of claim 1, wherein the three testing contact points are respectively disposed at a right side, a center and a left side of the at least one driving chip.

6. The inspection system of claim 1, wherein the at least one driving chip comprises at least one gate driving chip, at least one source driving chip, at least one integrated circuit integrated chip or a combination thereof.

7. The inspection system of claim 1, wherein the at least one circuit board comprises at least one flexible circuit.

8. An inspection method for a display device, the inspection method comprising:
providing a display device comprising a display panel, at least one circuit board and at least one driving chip that are electrically connected to the display panel, and a testing board that is electrically connected to the at least one circuit board, and the display panel comprising at least three testing conductive lines and a plurality of connecting conductive lines, wherein the at least one driving chip comprises:
at least three testing contact points, electrically connected with the at least one circuit board and the display panel, wherein each of the three testing contact points are respectively electrically connected with the three testing conductive lines, wherein the three testing conductive lines are connected together to form a testing signal line;
at least one comparator, electrically connected with the testing signal line; and
a logic circuit, electrically connected with the at least one comparator; performing a bonding resisting inspection procedure, comprising:
providing a test signal from the testing board, wherein the test signal is transmitted to the at least one driving chip through the at least one circuit board and the three testing conductive lines;
comparing the test signal with a reference signal;
if the test signal is greater than the reference signal, outputting a first signal through one of the plurality of connecting conductive lines; and
if the test signal is smaller than the reference signal, outputting a second signal through one of the plurality of connecting conductive lines.

9. The inspection method according to claim 8, further comprises performing a light on test process, prior to the step of performing the bonding resisting inspection procedure.

10. The inspection method according to claim 8, wherein the first signal represents a normal test result, if a voltage of the test signal is greater than a voltage of the reference signal.

11. The inspection method according to claim 8, wherein the second signal represents an abnormal test result, if a voltage of the test signal is smaller than a voltage of the reference signal.

12. The inspection method according to claim 8, wherein the at least one driving chip further comprises a register, and the first signal and the second signal are temporarily stored in the register.

13. The inspection method according to claim 8, wherein the three testing contact points are respectively disposed at a left side, a center, and a right side of the at least one driving chip.

14. The inspection method according to claim 8 further comprising transmitting the first signal and the second signal to the at least one testing board.

15. A display device, comprising:
a display panel, comprising at least three testing conductive lines and a plurality of connecting conductive lines;
at least one circuit board, electrically connected to the three testing conductive lines and the plurality of connecting conductive lines;
at least one driving chip, comprising:
a plurality of connecting contact points electrically connected with the plurality of connecting conductive lines and at least three testing contact points, and each of the three testing contact points being respectively electrically connected with the three testing conductive lines, wherein the three testing conductive lines are connected together to form a testing signal line;
at least one comparator, electrically connected with the testing signal line; and
at least one logic circuit, electrically connected with the least one comparator.

16. The display device of claim 15, wherein each of the testing conductive lines comprises a testing pad, wherein each of the testing contact point is electrically connected with the at least one testing conductive line through the testing pad.

17. The display device of claim 15, wherein the at least one driving chip further comprises a register.

18. The display device of claim 15, wherein the three testing contact points are respectively disposed at a left side, a center, and a right side of the at least one driving chip.

19. The display device of claim 15, wherein the at least one driving chip comprises at least one gate driving chip, at least one source driving chip, at least one integrated circuit integrated chip or a combination thereof.

20. The display device of claim 15, wherein the at least one circuit board comprises at least one flexible circuit.

* * * * *